(12) United States Patent
Devins et al.

(10) Patent No.: US 6,525,738 B1
(45) Date of Patent: Feb. 25, 2003

(54) DISPLAY LIST PROCESSOR FOR DECOUPLING GRAPHICS SUBSYSTEM OPERATIONS FROM A HOST PROCESSOR

(75) Inventors: Robert J. Devins, Essex Junction, VT (US); Robert S. Horton, Colchester, VT (US); Paul M. Schanely, Essex Junction, VT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/356,230

(22) Filed: Jul. 16, 1999

(51) Int. Cl.[7] .................................................. G09G 5/36
(52) U.S. Cl. ...................... 345/553; 345/502; 345/559; 345/558; 345/565
(58) Field of Search ......................... 345/553, 501–503, 345/520, 559, 564, 565, 558, 505, 420, 619, 627

(56) References Cited

U.S. PATENT DOCUMENTS

| | | | | |
|---|---|---|---|---|
| 4,888,712 A | * | 12/1989 | Barkans et al. ............. | 345/627 |
| 4,967,375 A | | 10/1990 | Pelham et al. ............... | 364/518 |
| 4,967,392 A | * | 10/1990 | Werner et al. ............... | 345/505 |
| 5,269,021 A | | 12/1993 | Denio et al. ................. | 395/700 |
| 5,276,798 A | | 1/1994 | Peaslee et al. ............... | 395/162 |
| 5,500,928 A | * | 3/1996 | Cook et al. .................. | 345/619 |
| 5,664,162 A | | 9/1997 | Dye ........................... | 345/521 |
| 5,706,478 A | | 1/1998 | Dye ........................... | 395/503 |
| 5,821,940 A | * | 10/1998 | Morgan et al. .............. | 345/420 |

* cited by examiner

*Primary Examiner*—Kee M. Tung
(74) *Attorney, Agent, or Firm*—M. F. Chadurjian; E. I. Shkurko; G. R. Pettit

(57) ABSTRACT

A system and method for decoupling graphics operations from a host processor to improve the efficiency of graphics rendering and free the host processor for other essential tasks. A processing system includes a host processor, a memory, a display list processor (DLP), graphics accelerators and display hardware. The host processor builds display lists generated by graphics applications and stores the display lists in the memory. The display lists include hardware function directives and control directives. The DLP accesses the memory to process the display lists, issuing the hardware function directives to the accelerators to generate display data.

33 Claims, 3 Drawing Sheets

DISPLAY LIST PROCESSOR FOR DECOUPLING GRAPHICS SUBSYSTEM OPERATIONS FROM A HOST PROCESSOR

CROSS REFERENCE TO RELATED APPLICATIONS

This application is related to U.S. application Ser. No. 09/283,386, entitled, "Method And System For Graphics Rendering Using Captured Graphics Hardware Instructions," and U.S. application Ser. No. 09/283,387, entitled, "Method And System For Graphics Rendering Using Hardware-Event-Triggered Execution Of Captured Graphics Hardware Instructions," assigned to International Business Machines Corporation and fully incorporated herein by reference.

BACKGROUND OF THE INVENTION

The present invention relates to the field of graphics processing, and in particular to a display list processor in a graphics subsystem for offloading graphics operations from a host processor.

Demand for sophisticated computer graphics has notably increased among consumers as graphics-based user interfaces displaying realistic icons, windows and the like have found widespread popularity. Advances in graphics software, including standardized graphics interfaces such as GKS (Graphics Kernel System) and PHIGS (Programmer's Hierarchical Graphics Standard) have made applications which generate complex 2D and 3D images, including animated images, comparatively easy to code, and consequently more prevalent.

Typically, to perform graphics rendering, instructions in a high-level graphics application program must be reduced to hardware-level instructions suitable for issuing to physical display hardware, and then the display hardware must be managed and serviced during the execution of the hardware-level instructions. Display hardware is generally raster-based, which means that each display is created from pixel information generated from the instructions and stored in a memory location known as a frame buffer, corresponding to the display screen. In a CRT display, for example, the digital pixel information is converted by a video controller into analog signals which determine the intensity and color of an electron beam scanning corresponding points on the display screen at a suitable rate.

Thus, operations associated with graphical displays include filling or modifying a frame buffer with pixel information, refreshing the pixel information at a rate high enough to avoid a ragged or jerky appearance in display images, and handling interrupts generated by display hardware.

Tasks required to render even a simple image can place heavy demands on a processor. In early graphics systems, a single processor handled all of the graphics tasks. However, such a system can be quickly overwhelmed by the graphics demands of more sophisticated images, slowing rendering and frustrating users.

Accordingly, graphics accelerators have been developed which, in combination with other display hardware, can effect a graphics subsystem which acts to relieve a host processor from certain graphics operations. Such accelerators incorporate fundamental rendering functions at a hardware level, such as line drawing, circle and polygon drawing and filling, and bit-block-transfer. Accelerators can execute high-speed register instructions for performing these basic functions to write graphical elements to a frame buffer, thereby offloading from the host processor the requirements of actually performing the hardware-level instructions to fill or modify the frame buffer. However, in such an architecture, typically the host processor must still feed the graphics instructions to the registers of the accelerator, and handle such chores as display screen refreshes and other tasks generated by hardware interrupts from the graphics subsystem.

Thus, a further refinement which has been developed for graphics subsystems having an accelerator is the provision of a dedicated subsystem memory for holding what is known as a "display list." A display list is a set of instructions for performing graphics operations, assembled by a host processor and stored in the graphics subsystem memory for execution by the accelerator without host processor intervention. In place of the host processor, a unit known as a display list processor (DLP) issues instructions in a display list to the accelerator, introducing a degree of independence into operations by the graphics subsystem, and reducing the burden on the host processor.

Approaches to the design of graphics subsystems utilizing display lists and DLP's vary widely in the art. Some approaches still require substantial host operations for communicating with and managing the DLP, and for handling hardware chores on the graphics subsystem.

In view of the foregoing, it is desirable to increase the independence of a graphics subsystem having a DLP, by reducing DLP management tasks for the host processor, and otherwise transferring functions usually performed by the host processor to the graphics subsystem, freeing the host processor for other necessary tasks.

SUMMARY OF THE INVENTION

A processing system according to the present invention utilizes a DLP which is capable of managing a graphics subsystem with a substantial degree of independence from a host processor. Once the DLP is initialized by the host processor, control of the DLP, and consequently, of the graphics subsystem, can be done entirely from the display list currently being processed.

In the general operation of the system, a host processor executes graphics application programs which generate graphics directives. The host processor organizes the directives into display lists and stores them in a memory accessible to the DLP.

The display lists generally comprise control directives and hardware function directives. Under the control of the control directives, the DLP issues the hardware function directives to graphics accelerators, which execute graphics operations in response thereto, to generate pixel information for display on a display device.

In an embodiment of the invention, the DLP includes registers which support the linking of a continuous series of operations with only nominal host processor operations being required. To assign work to the DLP, the host processor increments an incremental register in the DLP which indicates that one or more new display lists have been generated by the host processor and stored in the memory for processing by the DLP. Whenever this incremental register is updated, the DLP adds its contents to a second register in the DLP which maintains a count of display lists to be processed; the DLP then zeroes the incremental register. As long as the count in the second register is greater than zero, the DLP continues to process display lists. By communicating with the DLP through these registers, the host processor can link a continuous series of display lists together for processing by the DLP, and never needs to interrupt the DLP or determine its status in order to assign it new work.

The host processor may be further decoupled from graphics operations, according to the foregoing embodiment, by utilizing the DLP to perform functions triggered by hardware status signals which the DLP may be programmed to monitor through control directives in a display list. Registers in graphics accelerators which are readable by the DLP contain status information generated by hardware signals relating to graphics operations performed by the accelerators. The DLP also includes a register for status information on other selected hardware devices. These registers may be polled by the DLP under control of the control directives. The DLP monitors the registers, and delays or initiates specified operations depending on the status indicated in the registers. This feature allows the host processor to be decoupled from hardware interrupt handling for the graphics subsystem.

The foregoing features obtain optimum efficiency from a host processor and the graphics subsystem, allowing each to work at its maximum rate, and freeing the host processor to perform essential work unrelated to graphics processing.

DETAILED DESCRIPTION OF THE INVENTION

Figure 1:
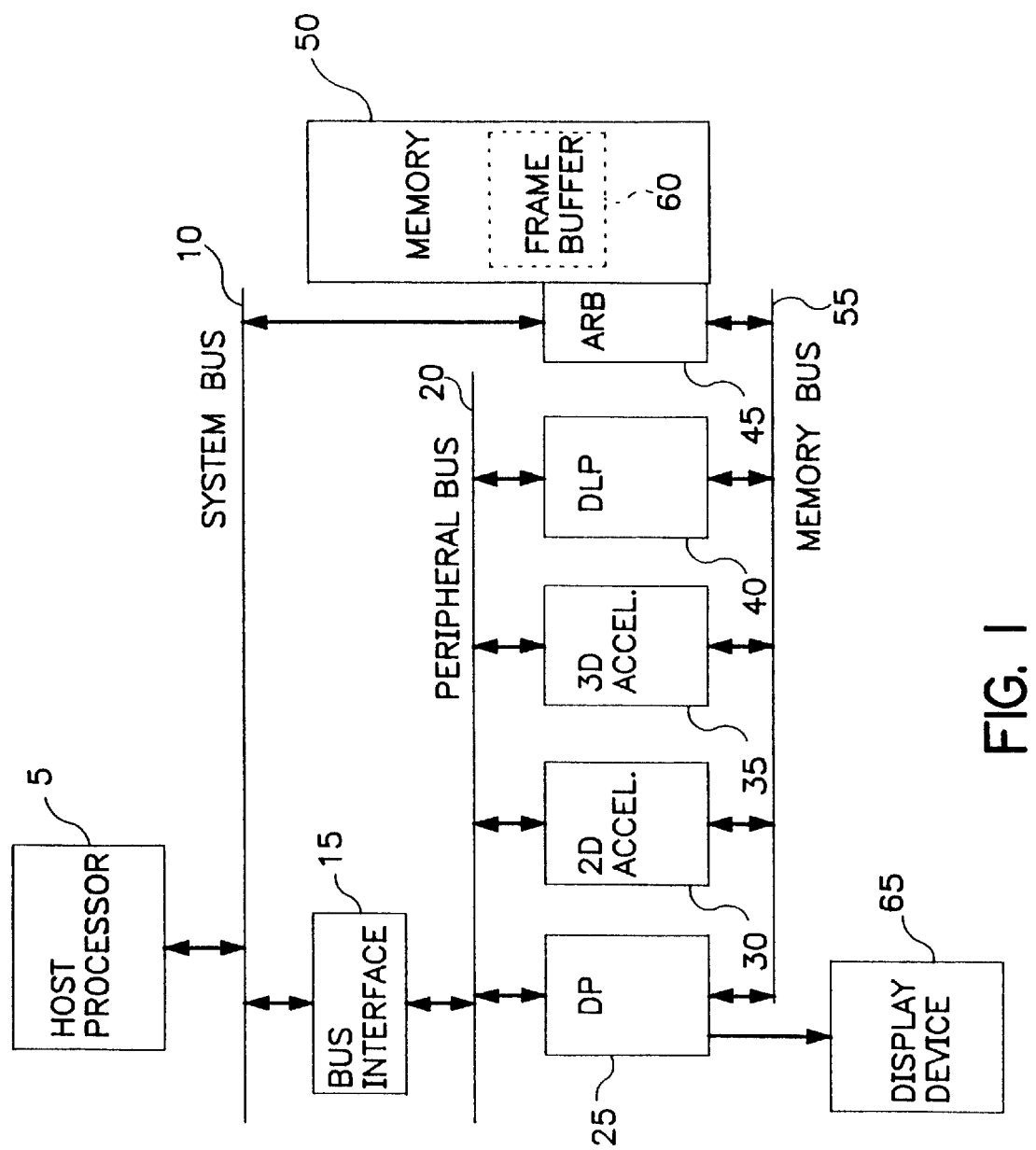
FIG. 1 shows a system overview of an embodiment of the present invention.

Referring now to FIG. 1, a system block diagram is shown depicting an embodiment of a processing system having a graphics subsystem according to the present invention. Host processor 5 communicates with the graphics subsystem via general purpose system bus 10 coupled with a bus interface 15. Bus interface 15 is in turn coupled with peripheral bus 20 for servicing the graphics subsystem comprising a display pipeline 25, a 2D accelerator 30, a 3D accelerator 35, a DLP 40, an arbitration control element 45, and a memory 50. Memory 50 may be a local subsystem memory as shown in FIG. 1, or may be configured as a portion of a main memory (not shown), in which host processor 5 is operating. Memory 50 includes a frame buffer 60. The graphics subsystem further comprises a memory bus 55 and display device 65.

In the general operation of the system, host processor 5 executes graphics application programs (not shown) generating graphics directives. The host processor 5 organizes the directives into display lists, which are stored on a memory 50 utilizing the system bus 10. Arbitration control element 45 arbitrates access to the memory 50, based on a priority scheme, between the host processor 5 and elements in the graphics subsystem which access the memory bus 55, including DLP 40, which accesses directives within the display lists stored on memory 50. The DLP 40 issues display directives in the display lists to 2D accelerator 30 and 3D accelerator 35, which, in response to the directives, perform graphics operations to generate pixel information which is loaded via memory bus 55 into frame buffer 60. The pixel information is then scanned by display pipeline 25, which may include a RAM and a digital-to-analog converter for converting the digital pixel information into analog signals, from frame buffer 60 into display device 65 (for example, a CRT) to produce an image.

Control of the DLP 40 can be done either by the host processor 5 or by directives in the display list that is being processed. Referring now to FIG. 3B, in general operation, DLP 40 processes directives in a display list such as display list 75, stored in the graphics subsystem memory 50. As shown in the example of display list 75, display lists typically comprise a sequence of DLP control directives 80 and hardware function directives 81. Generally, directives are of an address/data pair format, except when display lists include stream data, which is a sequence of data words not conforming to the address/data pair format.

Figure 3A:
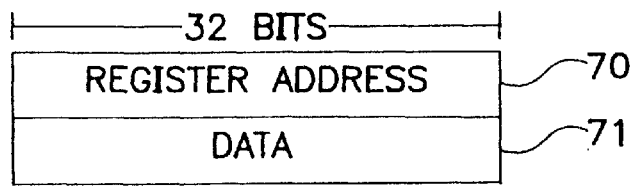
FIG. 3A shows the format of an address/data pair according to the present invention.
Figure 3B:
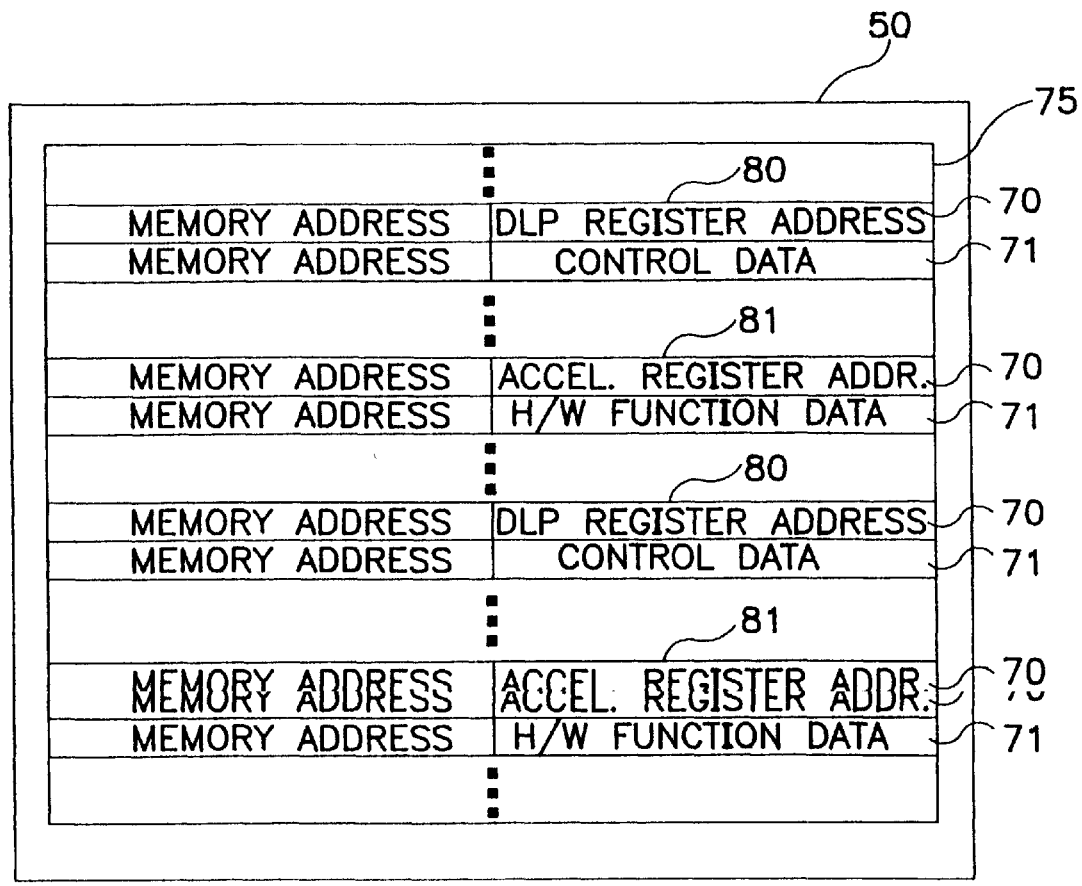
FIG. 3B shows an example of a display list stored in a graphics subsystem memory.

FIG. 3A shows the format 6f a typical (non-stream data) display list directive. Block 70 is an address for a register within DLP 40, or for a register within accelerator 30 or 35. Block 71 is data to be loaded into the register specified in block 72.

Hardware function directives 81 typically constitute commands to accelerators 30 and 35 to generate pixel information for filling or modifying a frame buffer 60 as described above. The control directives 80 for the DLP 40 comprise commands for controlling display list processing, including commands for list linking, pacing, looping stream mode, and sequence control. In pacing control, the DLP control directives may be used to condition the processing of a display list 75 based upon status information in hardware registers in accelerators 30 and 35. The information may indicate the status of graphics operations generated by the hardware function directives 81 within the display list, for example.

Figure 2:
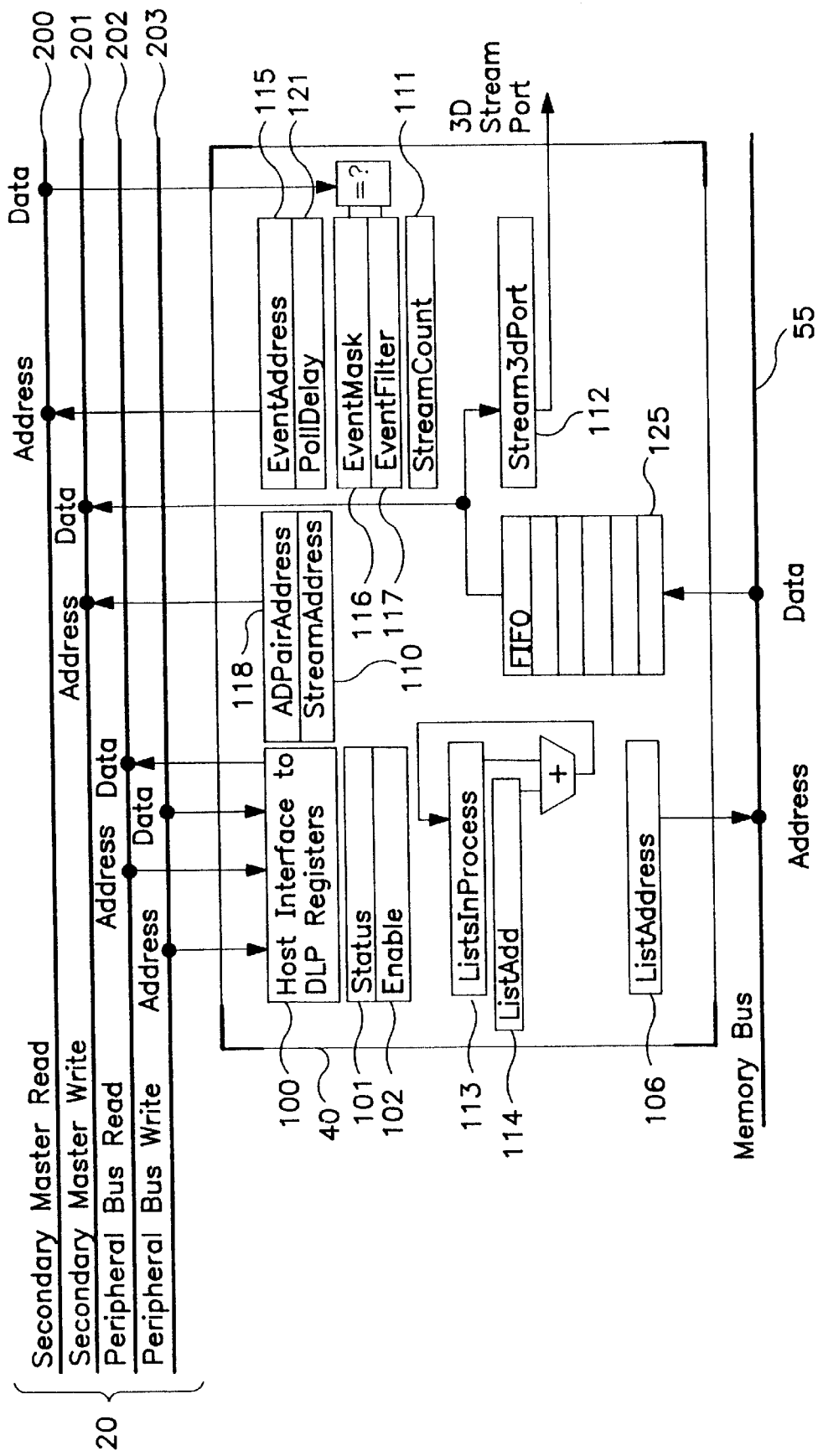
FIG. 2 shows the structure of the display list processor (DLP) according to the present invention in more detail.

Turning now to FIG. 2, there is shown a more detailed view of DLP 40 and associated hardware connections. Peripheral bus 20 includes secondary master read bus 200, secondary master write bus 201, peripheral bus read 202, and peripheral bus write bus 203. The DLP 40 acts as a secondary master on peripheral bus 20, performing operations when control of peripheral bus 20 is relinquished by master bus controller, bus interface 15.

Further illustrated in FIG. 2 are registers within the DLP 40 enabling advantageous features of the present invention to be implemented. The ListsInPtocess register 113 and ListAdd register 114 allow the DLP 40 to be notified of pending lists created by the host processor 5 and stored in memory 50 without the need for the host processor to query the status of the DLP 40, or to interrupt its current processing of a display list. Host interface 100 to the DLP registers permits host processor 5 control of the DLP 40.

The registers EventAddress 115, EventMask 116, and EventFilter 112 permit the DLP 40 to monitor the status of hardware registers in accelerators 30 and 35 in order to make pacing control decisions without host processor intervention. PollDelay register 121 is used in conjunction with the foregoing registers to insert a delay, if required, into accesses to the peripheral bus 20 for purposes of determining the status of hardware registers in accelerators 30 and 35.

Other registers included in the DLP 40 are the Status register 101 and the Enable register 102. Status register 101 includes bits (not shown) for providing information on the status of DLP internal modes and states, including bits for loop control, bits for indicating that the DLP is monitoring the condition of a hardware register for a particular condition, and a bit indicating that the DLP is currently processing a list.

The Enable register 102 determines the overall control of the DLP 40. It contains bits (not shown) for Start control, format control, List and Stream address register increment control, and trigger event arming. The Enable register Start bit must be set for any DLP operation to take place. The Enable register 102 allows a programmer, through directives in a display list, to individually or globally enable and disable the various functions of the DLP 40.

FIFO buffer 125 holds sixteen words of the display list currently being processed by the DLP 40, loaded in bursts from memory 50 via memory bus 55. The DLP 40 processes display list directives from the FIFO buffer 125 in the order in which they were loaded. A load of FIFO buffer 125 occurs as soon as the Enable Start bit is set and the ListsInProcess register 113 is greater than zero.

The loads of FIFO buffer 125 from memory 50 begin at the location specified in the ListAddress register 106. The ListAddress register 106 is initialized by the host processor 5 and is the address pointer to the list in the memory 50 currently being processed. Normally, the ListAddress register 106 is incremented as each directive in a display list is processed by DLP 40, although the increment can be disabled in the Enable register 102.

In general operation, the address of a new list can be supplied in the current list by an address/data pair directive which loads a new address into the ListAddress register 106. As a result, the next address/data pair to be processed by the DLP 40 will be loaded from the location in memory 50 specified in the ListAddress register 106. If the starting address of a new list is not supplied at the end of the list just completed, the next address/data pair to be processed by the DLP will be the one immediately following where the previous list ended.

Register ADPairAddress 118 is a read-only register that is used to hold the address of an address/data pair transfer, or the stream address when the DLP 40 is in streaming mode.

StreamAddress register 110 is used only in streaming mode, and holds the graphics hardware address where stream data is to be written. As mentioned above, an alternative format to address/data pairs in a list is stream data. The use of stream data saves time on the peripheral bus 20, since no arbitration is necessary. Rather, stream data is directed in bursts to a register or block of registers, or a port in accelerator 30 or 35. The stream data comprises commands and data for the accelerator.

In general, stream data can be transmitted via the peripheral bus 20, or to a 3D stream data port in accelerator 35, which is a special port that does not have to arbitrate or use the peripheral bus 20. Use of this special port is triggered by a control directive loading the StreamAddress register 110 with the address of the Stream3DPort register 112. Use of the special 3D port entails a "ready/valid" handshaking protocol to determine whether the port is ready to receive data.

Stream data in a display list must be preceded by an address/data pair directive which loads the StreamCount register 111. A greater-than-zero value in the StreamCount register 111 specifies the number of succeeding stream data words in the list, and puts the DLP 40 into streaming mode. The DLP 40 decrements the StreamCount register 111 with the completion of each stream data word transfer to the location specified in the StreamAddress register 110. When the StreamCount register 111 returns to zero, the DLP 40 exits streaming mode and data words in the display list are again treated as address/data pairs. The Enable register 102 includes a bit for enabling or disabling automatically incrementing the StreamAddress register 110 during streaming mode.

TABLE I

|  | Name | Address | Permitted Access |
|---|---|---|---|
| 101 | Status | BaseDLP + 0x00 |  |
| 102 | Enable | BaseDLP + 0x04 |  |
|  | EnableBit | BaseDLP + 0x08 |  |
|  | EnableSet | BaseDLP + 0x0c |  |
|  | EnableReset | BaseDLP + 0x10 |  |
| 106 | ListAddress | BaseDLP + 0x14 |  |
| 107 | ListAddressAdjust | BaseDLP + 0x18 |  |
| 108 | ListAddressPushPop | BaseDLP + 0x1c |  |
| 109 | ListAddressPushPopR | BaseDLP + 0x20 |  |
| 110 | StreamAddress | BaseDLP + 0x24 | Read/Write |
| 110 | StreamCount | BaseDLP + 0x28 | Read/Write |
| 112 | Stream3DPort | BaseDLP + 0x2c | Write |
| 113 | ListsInProcess | BaseDLP + 0x30 | Read/Write |
| 114 | ListAdd | BaseDLP + 0x34 | Write |
| 115 | EventAddress | BaseDLP + 0x38 | Read/Write |
| 116 | EvenMask | BaseDLP + 0x3c | Read/Write |
| 117 | EventFilter | BaseDLP + 0x40 | Read/Write |
| 118 | ADPairAddress | BaseDLP + 0x44 | Read |
| 119 | LoopCount | BaseDLP + 0x48 | Read/Write |
| 120 | ConditionalExecute | BaseDLP + 0x4c | Read/Write |
| 121 | PollDelay | BaseDLP + 0x50 | Read/Write |
| 122 | ListAddressStack | BaseDLP + 0x54 | Read/Write |
| 123 | StatusPort | BaseDLP + 0x58 | Read |
| 124 | NoOp | BaseDLP + 0x5c | Write |

As described above, display lists are generated by host processor 5 and stored in memory 50 for processing by DLP 40. According to the present invention, a plurality of lists can be linked together for continuous processing by the DLP 40 by employing the ListsInProcess register 113 and the ListAdd register 114. Without querying the status of DLP 40, or interrupting the processing of a current list by the DLP 40, the host processor 5 can indicate that a new list or lists have been stored on the memory 50 for processing, by writing the number of new lists that are ready to the ListAdd register 114. Whenever a value is written to the ListAdd register 114, the DLP 40 adds the value to the ListsInProcess register 113 and then zeros the ListAdd register 114. In general operation, whenever a non-zero value appears in the ListsInProcess register 113 and the Start bit in Enable register 102 is set, the DLP 40 will begin processing the directive in the display list pointed to by the ListAddress register 106.

The end of a display list is typically communicated to the DLP 40 by a directive in the list which loads negative one ("−1") into the ListAdd register 114. Since each load of the ListAdd register 114 causes the loaded value to be added to the ListsInProcess register 113 as described above, the ListsInProcess register 113 is decremented for each list which is completed by the DLP 40. Consequently, if the ListAdd register 114 has not been updated by the host processor 5 and all lists have been processed, the ListsInProcess register 113 will have value of zero, indicating that no new lists exist to be processed. The DLP 40 will stop and wait for the host processor 5 to load a non-zero value into the ListAdd register 114, denoting that the host processor 5 has stored a list or lists in the memory 50 to be processed.

As mentioned, the above-described arrangement allows the DLP 40 to process lists continuously without the need for the host processor 5 to query the status of DLP 40 or interrupt the processing of a current list by the DLP 40. Lists generated by the host processor 5 can be linked together, peripherally to current DLP 40 operations, by simply updating the ListAdd register 114.

The present invention includes a method for ensuring that address/data pairs in FIFO buffer 125 are always current when lists are linked. As described above, the DLP 40 includes a FIFO buffer 125 that holds up to 16 words of the current pending display list, loaded in bursts from memory 50. The DLP 40 processes display list directives from the FIFO buffer 125 in the order in which they were loaded. Because directives are processed from the FIFO buffer 125 rather than directly from memory 50, it is possible that memory contents corresponding a buffer load may change while that buffer load is being processed, leading to unpredictable results.

For example, a new list could be generated by host processor 5 and stored in memory 50 contiguously to a list currently being processed from FIFO buffer 125. The current load of FIFO buffer 125 may include the end of the current list; if it does, however, it may not include the beginning of the new list, if the storing of the new list began during or after the current FIFO buffer 125 load. Thus, the contents of the FIFO buffer 125 following the current end-of-list may be outdated.

According to the present invention, to ensure that the FIFO buffer 125 always contains correct data, a reload of the FIFO buffer 125 with the beginning of the new list is forced. This is accomplished by placing a ListAddressAdjust directive, with data specified as zero, after the end of the current list. Normally, a ListAddressAdjust directive is used to jump to a new location in a list by adding the contents of the ListAddressAdjust register 107 to the ListAddress register 106, which always points to the current list. However, the effect of a ListAddressAdjust directive with data specified as zero on the ListAddress register 106 is simply to increment it by four (byte addressing is used), to point to the next sequential directive as a result of a directive having been processed, since the offset added is zero.

In general operation, directives which (normally) cause the contents of the ListAddress register 106 to change (i.e., directives which load the ListAddress 106, ListAddressAdjust 107, ListAddressPushPop 108 and ListAddressPushPopR 109 registers (see Table I) also automatically cause a reload of the FIFO buffer 125 from the new location in ListAddress register 106. This is necessary since the DLP 40 gets its directives for processing from the FIFO buffer 125 and so the information therein must always be current. Thus, the effect of a ListAddressAdjust directive with data specified as zero is to increment the ListAddress register 106 to point to the next sequential directive, followed by a reload of the FIFO buffer 125 from the location pointed to by the ListAddress register 106.

If a ListAddressAdjust directive with data specified as zero is included after an end-of-list marker (i.e., a load of the ListAdd register 114 with negative one) in a display list in memory 50, the load of FIFO buffer 125 which includes the end-of-list marker will either include the ListAddressAdjust directive also, or else the last directive in the FIFO buffer 125 will be the end-of-list marker. In either case, when the processing of that list is complete, the ListAddress register 106 will point to the ListAddressAdjust directive in memory 50.

Consequently, the next directive to be processed by DLP 40 will be either the ListAddressAdjust directive in FIFO buffer 125, or the ListAddressAdjust directive from the memory 50, since this will be the first directive in the next load of FIFO buffer 125. In either case, the ListAddressAdjust directive will increment the ListAddress register 106 by one, and force a reload of the FIFO buffer 125. The reload will from the location specified in ListAddress register 106.

If host processor 5 builds a contiguous new list in memory 50, it will store it immediately following the ListAddress-Adjust directive. In either of the above-described cases, this is now the location pointed to by the ListAddress register 106, allowing for list linking with data that is always current.

The DLP 40 can be used to control the pacing of display list processing. A set. of registers is provided within the DLP 40 which allow for the testing of specified status conditions which arise commonly in the graphics subsystem. These registers were described briefly above, and comprise the EventAddress register 115, the EventMask register 116, the EventFilter register 112, and the PollDelay register 121. Control directives within a display list which load these registers can program the DLP 40 to monitor a hardware register in accelerator 30 or 35, or other status indicator, to check for a status condition specified in one of the control directives. When such control directives are encountered by the DLP 40, the DLP waits by polling the hardware register or other status indicator until a specific event has occurred which satisfies the condition, before going on to the next directive in the display list.

The DLP 40 can access status information either through connections, via the peripheral bus 20, to hardware registers within the accelerators 30 and 35 and the display pipeline 25, or through the DLP register StatusPort 123 (Table I). The StatusPort register 123 is provided to give direct access to selected hardwired status signals, to monitor hardware events external to the accelerators 30 and 35, without requiring access to the peripheral bus 20. In conjunction with the EventAddress 115, EventMask 116, EventFilter 112 registers, the StatusPort register 123 can be polled as described above.

In the foregoing pacing control, a load of EventFilter register 112 by a control directive defines a condition to be tested for. Another control directive loads the EventAddress register 115 with the address of a graphics hardware register in accelerators 30 or 35, or with the address of the StatusPort register 123.

A graphics hardware register typically contains status information which dynamically reflects the status of a graphics operation being performed by the accelerator. Typically, this is an operation specified by a hardware function directive within the same display list containing the control directives specifying a condition to be tested for. A control directive loading the EventMask register 116 is used to select bits to be tested in the graphics hardware register defined in the EventAddress register 115, for comparison with the condition set forth in the EventFilter register 112.

Loading of the EventMask register 116 and the EventFilter register 112 is done first. Then, polling of the graphics hardware register for the specified condition begins when the EventAddress register 115 is loaded, and the Start-Enable bit in the Enable register 102 is set. If the EventAddress register 115 has been loaded with the address of a graphics hardware register, the DLP 40 halts processing of the current list and instead periodically compares the EventFilter register 112 with the bits, selected by the EventMask register 116, in the graphics hardware register specified in the EventAddress register 115. An operation by the 2D or 3D accelerator 30 or 35 continues and a status condition for the operation is reflected in the specified graphics hardware register. When the comparison of the selected bits in the specified graphics hardware register with the EventFilter register 112 indicates a match, the DLP 40 moves on to process the next directive in the current list. The DLP 40 may also be forced to continue by the host processor 5 resetting a Trigger-On-Event-Enable bit (not shown) in the Enable register 102. The PollDelay register 121 may be used to insert a delay, if required, into accesses to the peripheral bus 20 for purposes of determining the status of hardware registers in accelerators 30 and 35.

If the EventAddress register 115 has been loaded with the address of the StatusPort register 123, polling is performed as above, but without requiring accesses to the peripheral bus 20. Instead, the status of selected devices having signals hardwired to the StatusPort register 123 may be monitored, and processing of a display list may be conditioned, as above, based on the status of such devices.

A ConditionalExecute register 120 (see Table I) enables conditional branching depending on the status of a hardware register in accelerator 30 or 35, or of StatusPort register 123, but without polling or causing the DLP 40 to halt. The ConditionalExecute register 120 is used in conjunction with the EventMask 116 and EventFilter 112 registers as described above, except that it is a one-time comparison. The ConditionalExecute register 120 is loaded by a control directive with the address of a hardware register in accelerator 30 or 35, or of StatusPort register 123. Selected bits of the hardware register or StatusPort register 123, as defined by the EventMask register 116, are compared with the condition specified in the EventFilter register 112. If there is a match (condition "true"), the DLP 40 processes the next directive sequentially. If there is not a match (condition "false"), the DLP 40 skips the next sequential directive and processes the one following it. The ConditionalExecute register 120 is also used in loop control as described below.

In the above-noted related application, "Method And System For Graphics Rendering Using Hardware-Event-Triggered Execution Of Captured Graphics Hardware Instructions," advantageous applications of the. pacing control feature of the present invention are described in detail. To summarize briefly, the feature can be used to free the host processor 5 from hardware interrupt handling for the graphics subsystem, which can instead be handled by control directives in a display list.

For example, in graphics rendering, a graphics accelerator such as 30 or 35 typically executes groups of operations, defined by hardware function directives, to move blocks of pixels (e.g., font character data) to a frame buffer such as 60. Such operations are sequential; i.e, the next one cannot be initiated until the previous one has completed. The status of each operation is reflected in a hardware register in the accelerator. Normally, it is up to the host processor 5 to poll for the status of an operation and, when it is complete, launch the next one. However, by using pacing control as described in the foregoing, the DLP 40 can be programmed to handle this work.

The DLP 40 can also be programmed to handle work required by hardware events occurring externally to accelerators 30 and 35. The status of such events could be reflected in the StatusPort register 123. By monitoring such external hardware events, periodic tasks such as refreshing pixel information in a frame buffer could be handled by the DLP 40, by programming it to swap frame buffer addresses when a vertical retrace sync signal, hardwired to the StatusPort register 123, is generated by display hardware.

Additionally, the DLP 40 can be programmed to monitor hardware status information reflected in registers in the display pipeline 25, such as raster line count. This information could be used, for example, to update cursor location and type.

Further control of the processing of a display list by the DLP 40 is provided by registers allowing for loop control. These include the LoopCount register 119 (Table I) for storing a value indicating the number of times a sequence of directives within a display list is to be repeated, and the ConditionalExecute register 120, which is used to test for a greater-than-zero value of the LoopCount register 119. These registers work in conjunction with the ListAddress register 106, which is used in looping to point back to the first directive in the loop sequence.

To perform looping, the LoopCount register 119 is loaded by a control directive with a value representing the number of times a selected sequence of display list directives is to be repeated. A control directive loading the ConditionalExecute register 120 with the address of the LoopCount register 119 is placed as the next-to-last directive in the sequence of directives to be repeated. This directive will cause the DLP 40 to decrement the LoopCount register 119 for each repetition of the loop, and to test the value of the LoopCount register 119 for a value greater than zero. If the result of the test is greater than zero, indicating that more repetitions of the loop sequence remain to be executed, the DLP 40 will process the next address/data pair directive in the display list. This directive will be a reload of the ListAddress register 106, which points back to the first directive in the loop sequence.

If the LoopCount register 119 is not greater than zero, the DLP 40 will ignore address/data pair following the load of the ConditionalExecute register 120 (i.e., the ListAddress reload), and processing will continue with the following data/address pair. Consequently, the loop is terminated, and further processing of the display list continues without host processor intervention.

It is possible to provide relative addressing for lists, allowing lists to be relocatable, by using the DLP registers ListAddress 106, ListAddressAdjust 107, ListAddressStack 112, ListAddressPushPop 108 and ListAddressPushPopR 109 (Table I). The latter two registers may be used to "push" and "pop" the ListAddress register 106 with an absolute value or a relative value, respectively.

Registers ListAddressPushPop 108 and ListAddressPushPopR 109 each hold the current value of ListAddress register 106. To load the ListAddress register 106 with an absolute value, the ListAddressPushPop register 108 is used. When register ListAddressPushPop 108 is used to "push" the ListAddress register 106, the current display list processing sequence is interrupted. Instead, the current value of ListAddress register 106 is saved in ListAddressStack register 122, the value in the ListAddressAdjust register 107 is loaded into the ListAddress register 106, and the list processing sequence begins with the address/data pair at that location.

To load the ListAddress register 106 with a relative value, the ListAddressPushPopR register 109 is used. When register ListAddressPushPopR 109 is used to "push" the ListAddress register 106, the current value of ListAddress register 106 is saved in ListAddressStack register 122, and the value in the ListAddressAdjust register 107 is treated as a value to be added or subtracted from the ListAddress register 106. The processing sequence shifts to the address/data pair at the location obtained thereby.

When the registers ListAddressPushPop 108 and ListAddressPushPopR 109 are "popped", the value saved in the ListAddressStack register 122 during a "push" operation is retrieved and loaded into the ListAddress register 106 to resume the former list processing sequence. Popping the stack is done by loading a reserved data value of 0xffffffff (where "0x" denotes a hexadecimal value).

An example of an application enabled by the above-described registers would be for multiple lists to share a common list which would poll status information used by all the lists, by including directives in each list to load the ListAddressPushPop 108 and ListAddressPushPopR 109 registers as above, to jump to the common list.

A NoOp register 124 (Table I) is included for display list coding convenience. The DLP 40 behaves somewhat like a generic processor and during debug or in practice the NoOp register 124 can be used to hold list locations without adjusting the whole list with all the carefully calculated addresses.

The following are some illustrative examples of the advantageous features provided by the present invention.

Table 1A below shows the DLP 40 registers in an initialized state. "0x" denotes a hexadecimal value. DLP 40 registers have a base offset of 0x80030000 applied to them.

TABLE 1A

| Register Address | Register Contents | Description |
|---|---|---|
| 0x80030000 | 0x00000000 | Status |
| 0x80030004 | 0x00000001 | Enable (Start bit is on) |
| 0x80030014 | 0x00001004 | ListAddress |
| 0x80030018 | 0x00000000 | ListAddressAdjust |
| 0x8003001c | 0x00000000 | ListAddressPushPop |
| 0x80030020 | 0x00000000 | ListAddressPushPopR |
| 0x80030024 | 0x00000000 | StreamAddress |
| 0x80030028 | 0x00000000 | StreamCount |
| 0x8003002c | 0x00000000 | Stream3dPort |
| 0x80030030 | 0x00000000 | ListsInProcess |
| 0x80030034 | 0x00000000 | ListAdd |
| 0x80030038 | 0x00000000 | EventAddress |
| 0x8003003c | 0x00000000 | EventMask |
| 0x80030040 | 0x00000000 | EventFilter |
| 0x80030044 | 0x00000000 | ADPairAddress |
| 0x80030048 | 0x00000000 | LoopCount |
| 0x8003004c | 0x00000000 | ConditionalExecute |
| 0x80030050 | 0x00000000 | PollDelay |
| 0x80030054 | 0x00000000 | ListAddressStack |
| 0x80030058 | 0x00000000 | StatusPort |
| 0x8003005c | 0x00000000 | NoOp |

Table 1B below shows a display list of address/data pairs in memory 50 comprising three hardware function directives. When processed by the DLP 40, the display list will load first, second and third hardware registers in an accelerator 30 or 35 with the data "aa", "bb" and "cc", respectively. These data represent, for example, graphics operations for filling or modifying a frame buffer 60.

TABLE 1B

| Memory Address | Address/ Data Pairs | Description |
|---|---|---|
| 0x00001000 | 0x00000000 | |
| 0x00001004 | 0x80020004 | first entry of list, address to 1st hardware register |
| 0x00001008 | 0x000000aa | data to 1st hardware register |
| 0x0000100c | 0x80020008 | address to 2nd hardware register |
| 0x00001010 | 0x000000bb | data to 2nd hardware register |
| 0x00001014 | 0x8002000a | address to 3rd hardware register |
| 0x00001018 | 0x000000cc | data to 3rd hardware register |
| 0x0000101c | 0x80030034 | DLP address to ListAdd register |
| 0x00001020 | 0xffffffff | ("-1") End-of-List |
| 0x00001024 | 0x80030018 | ListAddressAdjust to force FIFO reload to be safe |
| 0x00001028 | 0x00000000 | jump to next location |
| 0x0000102c | 0x00000000 | |
| 0x00001030 | 0x00000000 | |

Table 1C below shows hardware registers in accelerator 30 or 35. Register contents, for this example, are initially 0.

TABLE 1C

| Register Address | Register Contents |
|---|---|
| 0x80020004 | 0x00000000 |
| 0x80020008 | 0x00000000 |
| 0x8002000c | 0x00000000 |

To start execution of the display list in Table 1B, host processor 5 writes 0x00000001 to the ListAdd register 114, at address 0x80030034. Consequently, the DLP 40 adds 0x00000001 to the ListsInProcess register 113 at address 0x80030030. Since the ListInProcess register 113 is now greater than zero, the DLP 40 processes the directive pointed to by the ListAddress register 106, which contains 0x00001004, i.e., the memory address of the start of the list in Table 1B. The DLP 40 begins to process the list shown in Table 1B.

After processing the directive represented by

| 0x0000101c | 0x80030034 | DLP address to ListAdd register |
|---|---|---|
| 0x00001020 | 0xffffffff | ("-1") End-of-List |

(i.e., a load of the ListAdd register 114 with negative one), the DLP 40 decrements the ListsInProcess register 113 (i.e., adds the contents of the ListAdd register 114 to the ListsInProcess register 113) and stops, since the ListInProcess register 110 now contains zero.

Among DLP 40 registers that will appear differently from Table 1A is the ListAddress register 106. ListAddress register 106 now contains the address of the directive following the End-of-List marker:

| Register Address | Register Contents | |
|---|---|---|
| 0x80030014 | 0x00001024 | (ListAddress register 106) |

The hardware function directives in the display list of Table 1B have been processed by the DLP 40, and accordingly, the hardware registers in accelerators 30 or 35 have been loaded. Consequently Table 1C now appears as:

TABLE 1C

| Register Address | Register Contents |
|---|---|
| 0x80020004 | 0x000000aa |
| 0x80020008 | 0x000000bb |
| 0x8002000c | 0x000000cc |

In the following example, the DLP 40 registers initially have the status resulting from the processing of the display list in Table 1B, as shown below in Table 2A:

TABLE 2A

| Register Address | Register Contents | Description |
|---|---|---|
| 0x80030000 | 0x00000000 | Status |
| 0x80030004 | 0x00000001 | Enable (Start bit is on) |

TABLE 2A-continued

| Register Address | Register Contents | Description |
| --- | --- | --- |
| 0x80030014 | 0x00001024 | ListAddress |
| 0x80030018 | 0x00000000 | ListAddressAdjust |
| 0x8003001c | 0x00000000 | ListAddressPushPop |
| 0x80030020 | 0x00000000 | ListAddressPushPopR |
| 0x80030024 | 0x00000000 | StreamAddress |
| 0x80030028 | 0x00000000 | StreamCount |
| 0x8003002c | 0x00000000 | Stream3dPort |
| 0x80030030 | 0x00000000 | ListsInProcess |
| 0x80030034 | 0x00000000 | ListAdd |
| 0x80030038 | 0x00000000 | EventAddress |
| 0x8003003c | 0x00000000 | EventMask |
| 0x80030040 | 0x00000000 | EventFilter |
| 0x80030044 | 0x80030034 | ADPairAddress |
| 0x80030048 | 0x00000000 | LoopCount |
| 0x8003004c | 0x00000000 | ConditionalExecute |
| 0x80030050 | 0x00000000 | PollDelay |
| 0x80030054 | 0x00000000 | ListAddressStack |
| 0x80030058 | 0x00000000 | StatusPort |
| 0x8003005c | 0x00000000 | NoOp |

Table 2B below shows the last two directives of the display list in Table 1B, followed by a new display list. The new display list has been stored by the host processor 5 contiguously to the display list of Table 2A, immediately after the ListAddressAdjust directive with data of zero for forcing a FIFO reload, at memory addresses 0x00001024 and 0x00001028. The new display list, when processed by the DLP 40, will write a short sequence of stream data to a single address port.

TABLE 2B

| Memory Address | Address/ Data Pairs (+ Stream Data) | Description |
| --- | --- | --- |
| 0x00001014 | 0x8002000c | address to 3rd hardware register |
| 0x00001018 | 0x000000cc | data to 3rd hardware register |
| 0x0000101c | 0x80030034 | DLP address to ListAdd register |
| 0x00001020 | 0xffffffff | ("-1") End-of-List . . . (Table 1B example) |
| 0x00001024 | 0x80030018 | ListAddressAdjust to force FIFO reload to be safe |
| 0x00001028 | 0x00000000 | jump to next location |
| 0x0000102c | 0x80030024 | DLP address to StreamAddress <= processing begins here |
| 0x00001030 | 0x00300000 | address of streaming port |
| 0x00001034 | 0x80030028 | DLP address to StreamCount |
| 0x00001038 | 0x00000008 | number of 3d stream data words |
| 0x0000103c | 0x0000f04d | Stream data . . . Screen -W 256 -H 256 |
| 0x00001040 | 0x01000100 | Stream data . . . |
| 0x00001044 | 0x00003081 | Stream data . . . ColorZPitch -P 256 |
| 0x00001048 | 0x80030000 | Stream data . . . |
| 0x0000104c | 0x00007004 | Stream data . . . Enable -SW 1 -At 1 -Vb 1 -Top 1 -Tx 1 |
| 0x00001050 | 0x00030830 | Stream data . . . |
| 0x00001054 | 0x0000f058 | Stream data . . . TextureData -SizeU 7 -Sized 7 -TxFmt 2 |
| 0x00001058 | 0x77002000 | Stream data . . . |
| 0x0000105c | 0x80030034 | DLP address to ListAdd register |
| 0x00001060 | 0xffffffff | ("-1") End-of-List |
| 0x00001064 | 0x80030014 | DLP address to ListAddress <= processing begins here |
| 0x00001068 | 0x00001100 | Address of start of a new list |
| 0x0000106c | 0x00000000 |  |
| 0x00001070 | 0x00000000 |  |

In Table 2B, the data in memory 50 addresses 0x0000103c through 0x00001058 are stream data, i.e., not address/data pairs. Immediately preceding the stream data at addresses 0x00001034 and 0x00001038 is an address/data pair directive loading the StreamCount register 111 with the number of stream data words (8) that follow. Preceding that directive is a directive at addresses 0x0000102c and 0x00001030 which loads StreamAddress register 110 with the address of a port (0x00300000) in 3D accelerator 35. The stream data words constitute commands and data to accelerator 35 for performing graphics operations.

To start execution of the display list in Table 2B, host processor 5 writes 0x00000001 to the ListAdd register 114, at address 0x80030034. Consequently, DLP 40 adds 0x00000001 to the ListsInProcess register 113 at address 0x80030030.

Since the ListsInProcess register 113 is now greater than zero, the DLP 40 processes the directive pointed to by the ListAddress register 106, which contains 0x00001024. The directive at this memory address is a ListAddressAdjust directive with data of zero, which causes a reload of FIFO buffer 125 with memory 50 contents immediately following the ListAddressAdjust directive. Thus, processing begins with the StreamAddress directive at 0x0000102c.

After the StreamAddress directive is processed, the StreamCount directive causes the DLP 40 to enter streaming mode, and the 8 stream data words are written to the specified port in 3D accelerator 35. When processing reaches location 0x00001060, which contains an end-of-list marker, the DLP 40 decrements the ListsInProcess register 113 and stops.

The following shows an example of list linking. Three display lists containing stream data are processed by the DLP 40 without stopping.

In the following example, the DLP 40 registers initially have the status resulting from the processing of the display list in Table 2B, as shown below in Table 3A:

TABLE 3A

| Register Address | Register Contents | Description |
| --- | --- | --- |
| 0x80030000 | 0x00000000 | Status |
| 0x80030004 | 0x00000001 | Enable (Start bit is on) |
| 0x80030014 | 0x00001064 | ListAddress |
| 0x80030018 | 0x00000000 | ListAddressAdjust |
| 0x8003001c | 0x00000000 | ListAddressPushPop |
| 0x80030020 | 0x00000000 | ListAddressPushPopR |
| 0x80030024 | 0x00300000 | StreamAddress |
| 0x80030028 | 0x00000000 | StreamCount |
| 0x8003002c | 0x00000000 | Stream3dPort |
| 0x80030030 | 0x00000000 | ListsInProcess |
| 0x80030034 | 0x00000000 | ListAdd |
| 0x80030038 | 0x00000000 | EventAddress |
| 0x8003003c | 0x00000000 | EventMask |
| 0x80030040 | 0x00000000 | EventFilter |
| 0x80030044 | 0x80030034 | ADPairAddress |
| 0x80030048 | 0x00000000 | Loopcount |
| 0x8003004c | 0x00000000 | ConditionalExecute |
| 0x80030050 | 0x00000000 | PollDelay |
| 0x80030054 | 0x00000000 | ListAddressStack |
| 0x80030058 | 0x00000000 | StatusPort |
| 0x8003005c | 0x00000000 | NoOp |

Table 3B below shows the last two stream data words and the end-of-list marker of the display list in Table 2B, followed by a load of the ListAddress register 106 to point to a new display list. This is shown by the address/data pair at memory locations 0x00001064 and 0x00001068, respectively.

TABLE 3B

| Memory Address | Address/ Data Pairs (+ Stream Data) | Description |
|---|---|---|
| 0x00001054 | 0x0000f058 | Stream data . . . TextureData -SizeU 7 -Sized 7 -TxFmt 2 |
| 0x00001058 | 0x77002000 | Stream data . . . |
| 0x0000105c | 0x80030034 | DLP address to ListAdd register |
| 0x00001060 | 0xffffffff | ("-1") End-of-List |
| 0x00001064 | 0x80030014 | DLP address to ListAddress <= processing begins here |
| 0x00001068 | 0x00001100 | Address of start of a new list |
| 0x0000106c | 0x00000000 | |
| 0x00001070 | 0x00000000 | |
| . . . | . . . | |
| . . . | . . . | |
| 0x00001100 | 0x80030028 | DLP address to StreamCount |
| 0x00001104 | 0x0000000a | number of 3d stream data words |
| 0x00001108 | 0x0000f059 | Stream data . . . TextureControl -WrapS 1 -Wrapt 1 -Blend 2 |
| 0x0000110c | 0x05020202 | Stream data . . . |
| 0x00001110 | 0x0000f064 | Stream data . . . ZStencilTest -StencilConstant 0 -Ztest 1 . . . |
| 0x00001114 | 0x00000001 | Stream data . . . |
| 0x00001118 | 0x0000f066 | Stream data . . . ZStencilMask -StencilMask 0xff -ZMask 0xffffff |
| 0x0000111c | 0xffffffff | Stream data . . . |
| 0x00001120 | 0x0000f062 | Stream data . . . AlphaColorMask -M 0xffffff |
| 0x00001124 | 0xffffffff | Stream data . . . |
| 0x00001128 | 0x0000f072 | Stream data . . . ColorConstant1 -R 210 -G 112 -B 47 -A 187 |
| 0x0000112c | 0xbbd2702f | Stream data . . . |
| 0x00001130 | 0x80030034 | DLP address to ListAdd register |
| 0x00001134 | 0xffffffff | ("-1") End-of-List |
| 0x00001138 | 0x00000000 | |
| 0x0000113c | 0x00000000 | |

To start execution of the new display list in Table 3B, host processor 5 writes 0x00000001 to the ListAdd register 114, at address 0x80030034. Consequently, the DLP 40 adds 0x00000001 to the ListsInProcess register 113 at address 0x80030030.

Since the ListsInProcess register 113 is now greater than zero, the DLP 40 processes the directive currently pointed to by the ListAddress register 106. As a result of processing the display list of Table 2B, the ListAddress register 106 now has a value of 0x00001064. As mentioned above, this memory location contains a directive which is a load of the ListAddress register 106 to point to a new display list at memory address 0x00001100. Thus, processing begins of the display list at memory address 0x00001100.

While the DLP 40 is processing this list, host processor 5 creates two new lists and stores them in memory 50, as shown below in Table 3B(i):

TABLE 3B(i)

| Memory Address | Address/ Data Pairs (+ Stream Data) | Description |
|---|---|---|
| 0x00001130 | 0x80030034 | DLP address to ListAdd register |
| 0x00001134 | 0xffffffff | ("-1") End-of-List |
| 0x00001138 | 0x80030014 | DLP address to ListAddress |
| 0x0000113c | 0x00001200 | Address of start of a new list |
| . . . | . . . | |
| . . . | . . . | |
| 0x00001200 | 0x80030028 | DLP address to StreamCount |
| 0x00001204 | 0x00000008 | number of 3d stream data words |
| 0x00001208 | 0x0000f073 | Stream data . . . ColorConstant2 -R 224 -G 160 -B 113 -A 59 |
| 0x0000120c | 0x3be0a071 | Stream data . . . |

TABLE 3B(i)-continued

| Memory Address | Address/ Data Pairs (+ Stream Data) | Description |
|---|---|---|
| 0x00001210 | 0x0000f060 | Stream data . . . AlphaColorTest -ATest 7 -CTest 7 -CS2 3 -Cfail 1 |
| 0x00001214 | 0x07070301 | Stream data . . . |
| 0x00001218 | 0x0000f070 | Stream data . . . ColorALU -FmtD 2 -Source2 3 -LogicOp 3 -Prod1 4 . . . |
| 0x0000121c | 0x02330405 | Stream data . . . |
| 0x00001220 | 0x0000f074 | Stream data . . . FogColor -R 180 -G 180 -B 220 -A 127 |
| 0x00001224 | 0x7fb4b4dc | Stream data . . . |
| 0x00001228 | 0x80030034 | DLP address to ListAdd register |
| 0x0000122c | 0xffffffff | ("-1") End-of-List |
| 0xD0001230 | 0x80030014 | DLP address to ListAddress |
| 0x00001234 | 0x00001300 | Address of start of a new list |
| . . . | . . . | |
| . . . | . . . | |
| 0x00001300 | 0x80030028 | DLP address to StreamCount |
| 0x00001304 | 0x00000004 | number of 3d stream data words |
| 0x00001308 | 0x0000f073 | Stream data . . . ColorConstant2 -R 224 -G 160 -B 113 -A 59 |
| 0x0000130c | 0x3be0a071 | Stream data . . . |
| 0x00001310 | 0x0000f060 | Stream data . . . AlphaColorTest -ATest 7 -CTest 7 -CS2 3 -Cfail 1 |
| 0x00001314 | 0x07070301 | Stream data . . . |
| 0x00001318 | 0x80030034 | DLP address to ListAdd register |
| 0x0000131c | 0xffffffff | ("-1") End-of-List |
| 0x00001320 | 0x00000000 | |
| 0x00001324 | 0x00000000 | |

To notify the DLP 40 that two new lists have been generated and need to be processed, host processor 5 writes 0x00000002 to the ListAdd register 114 at register address 0x80030034. The DLP 40 adds the contents of the ListAdd register 106 to the ListsInProcess register 113, and then zeroes the ListAdd register. The ListsInProcess register 113 now looks as shown below:

| Register Address | Register Contents | |
|---|---|---|
| 0x80030030 | 0x00000003 | (ListsInProcess register 113) |

After the DLP 40 processing reaches the end of the first list at location 0x00001134, (i.e., a load of the ListAdd register 114 with negative one), the DLP 40 decrements the ListsInProcess register 113 (i.e., adds the contents of the ListAdd register 114 to the ListsInProcess register 113). The ListsInProcess register 113 now looks as shown below:

| Register Address | Register Contents | |
|---|---|---|
| 0x80030030 | 0x00000002 | (ListsInProcess register 113) |

The ListsInProcess register 113 still contains a value greater than zero, so DLP 40 processing continues. A new value is loaded into the ListAddress register 106 by the directive at memory address 0x00001138, and a jump to the first of the two new lists at memory address 0x00001200 occurs.

After the DLP 40 processes the end-of-list directive for the first new list at memory addresses 0x00001228 and 0x0000122c, the ListsInProcess register 113 is again decremented. However, the ListsInProcess register 113 still contains a value greater than zero so DLP 40 processing continues. A new value is loaded into the ListAddress register 106 by the directive at memory address 0x00001230, and a jump to the second of the two new lists at memory address 0x00001300 occurs.

DLP processing stops after processing the end-of-list directive for the second of the two new lists at memory addresses 0x00001318 and 0x0000131c. The ListsInProcess register 113 is decremented and appears as shown below:

| Register Address | Register Contents | |
|---|---|---|
| 0x80030030 | 0x00000000 | (ListsInProcess register 113) |

Since the ListsInProcess register 113 is now zero and the ListAdd register 114 has not been updated by the host processor 5, the DLP 40 stops.

The following shows of an example of using a display list to program the DLP 40 to poll a hardware register in an accelerator 30 or 35, to condition processing on the status of a hardware event as reflected in the hardware register.

Table 4A below shows the DLP 40 registers in an initialized state.

TABLE 4A

| Register Address | Register Contents | Description |
|---|---|---|
| 0x80030000 | 0x00000000 | Status |
| 0x80030004 | 0x00000001 | Enable (Start bit is on) |
| 0x80030014 | 0x00001004 | ListAddress |
| 0x80030018 | 0x00000000 | ListAddressAdjust |
| 0x8003001c | 0x00000000 | ListAddressPushPop |
| 0x80030020 | 0x00000000 | ListAddressPushPopR |
| 0x80030024 | 0x00000000 | StreamAddress |
| 0x80030028 | 0x00000000 | StreamCount |
| 0x8003002c | 0x00000000 | Stream3dPort |
| 0x80030030 | 0x00000000 | ListsInProcess |
| 0x80030034 | 0x00000000 | ListAdd |
| 0x80030038 | 0x00000000 | EventAddress |
| 0x8003003c | 0x00000000 | EventMask |
| 0x80030040 | 0x00000000 | EventFilter |
| 0x80030044 | 0x00000000 | ADPairAddress |
| 0x80030048 | 0x00000000 | LoopCount |
| 0x8003004c | 0x00000000 | ConditionalExecute |
| 0x80030050 | 0x00000000 | PollDelay |
| 0x80030054 | 0x00000000 | ListAddressStack |
| 0x80030058 | 0x00000000 | StatusPort |
| 0x8003005c | 0x00000000 | NoOp |

Table 4B below shows a display list in memory 50. As in the first example, when processed by DLP 40, the display list will load first, second and third hardware registers in an accelerator 30 or 35 with the data "aa", "bb" and "cc", respectively. However, the display list in Table 4B programs the DLP 40 to wait for a "positive edge trigger", i.e., a change in a register bit from "0" to "1". The bit reflects a status condition in a specified hardware register in an accelerator 30 or 35.

TABLE 4B

| Memory Address | Address/Data Pairs | Description |
|---|---|---|
| 0x00001000 | 0x00000000 | |
| 0x00001004 | 0x80030040 | DLP address to EventFilter register |
| 0x00001008 | 0x00000000 | Looking for a level 0 |
| 0x0000100c | 0x8003003c | DLP address to EventMask register |
| 0x00001010 | 0x00000010 | Mask bit 4 |
| 0x00001014 | 0x80030038 | DLP address to EventAddress register |

TABLE 4B-continued

| Memory Address | Address/Data Pairs | Description |
|---|---|---|
| 0x00001018 | 0x00200350 | Poll Address of Graphic Hardware register |
| 0x0000101c | 0x80030040 | DLP address to EventFilter register |
| 0x00001020 | 0x00000010 | Looking for a level 1 |
| 0x00001024 | 0x80030038 | DLP address to EventAddress register |
| 0x00001028 | 0x00200350 | Poll Address of Graphic Hardware register |
| 0x0000102c | 0x80020004 | first entry of list, address to 1st hardware register |
| 0x00001030 | 0x000000aa | data to 1st hardware register |
| 0x00001034 | 0x80020008 | address to 2nd hardware register |
| 0x00001038 | 0x000000bb | data to 2nd hardware register |
| 0x0000103c | 0x8002000c | address to 3rd hardware register |
| 0x00001040 | 0x000000cc | data to 3rd hardware register |
| 0x00001044 | 0x80030034 | DLP address to ListAdd register |
| 0x00001048 | 0xffffffff | ("-1") End-of-List |
| 0x0000104c | 0x00000000 | |
| 0x00001050 | 0x00000000 | |
| 0x00001054 | 0x00000000 | |
| 0x00001058 | 0x00000000 | |

Table 4C below shows hardware registers in accelerator 30 or 35. Register contents are initially 0.

TABLE 4C

| Register Address | Register Contents |
|---|---|
| 0x80020004 | 0x00000000 |
| 0x80020008 | 0x00000000 |
| 0x8002000c | 0x00000000 |

DLP 40 processing begins with the directive at memory address 0x00001004. This directive loads the EventFilter register 112, at address 0x80030040, with a status condition to be tested for. The next directive loads the EventMask register 116, at address 0x8003003c, with the value 0x00000010. The next directive loads the EventAddress register 115 at address 0x80030038, with the address of a hardware register in an accelerator 30 or 35, in this case, 0x00200350. Thus, these three directives program the DLP 40 to poll the fourth bit of register 0x00200350 for the value of "0", before proceeding to the next directive in Table 4B. When the EventAddress register 115 is loaded (the directive at 0x00001014 and 0x00001018), polling begins.

When the polled bit goes to "0", the next three directives (memory addresses in Table 4B from 0x0000101c through 0x00001028) program the DLP 40 to poll the same bit for a value of "1" (i.e., a "positive edge"). When the EventAddress register 115 is loaded (the directive at 0x00001024 and 0x00001028), polling begins.

When the polled bit goes to "1", the remaining directives load three registers in an accelerator 30 or 35 with the data "aa", "bb" and "cc", respectively. The ListAdd register 114 is loaded with negative one, which is added to the ListsInProcess register 113, decrementing it to zero. DLP 40 processing stops. Table 4C now appears as:

TABLE 4C

| Register Address | Register Contents |
|---|---|
| 0x80020004 | 0x000000aa |
| 0x80020008 | 0x000000bb |
| 0x8002000c | 0x000000cc |

The foregoing description of the invention illustrates and describes the present invention. Additionally, the disclosure shows and describes only the preferred embodiments of the invention, but as aforementioned, it is to be understood that the invention is capable of use in various other combinations, modifications, and environments and is capable of changes or modifications within the scope of the inventive concept as expressed herein, commensurate with the above teachings, and/or the skill or knowledge of the relevant art. The embodiments described hereinabove are further intended to explain best modes known of practicing the invention and to enable others skilled in the art to utilize the invention in such, or other, embodiments and with the various modifications required by the particular applications or uses of the invention. Accordingly, the description is not intended to limit the invention to the form disclosed herein. Also, it is intended that the appended claims be construed to include alternative embodiments.

What is claimed is:

1. A processing system comprising:

a system bus;

a display list stored in a memory and comprising hardware function directives and control directives;

a host processor coupled to the system bus which generates and stores said display list in said memory;

a peripheral bus coupled to the system bus;

a graphics accelerator, coupled to the peripheral bus, for receiving said hardware function directives and for performing graphics operations in response thereto; and a programmable display list processor coupled to the peripheral bus for processing said display list in accordance with said control directives, said processing including issuing said hardware function directives to said graphics accelerator.

2. The processing system of claim 1, said display list processor further comprising:

a first register for indicating to the display list processor a count of display lists, generated and stored by the host processor in said memory, to be processed by the display list processor;

a second register for receiving from the host processor an increment of at least one to said count, indicating that at least one new display list has been stored in said memory for processing; and means for adding said increment in said second register to said first register.

3. The processing system of claim 2, said display list processor further comprising means for zeroing said second register after adding said increment; and means for decrementing said first register by one each time the processing of a display list is completed.

4. The processing system of claim 3 wherein said means for decrementing includes a control directive loading said second register with a value of negative one.

5. The processing system of claim 1, said display list processor further comprising a FIFO buffer for storing a portion of the display list currently being processed.

6. The processing system of claim 5, said display list processor further comprising:

a register for storing the address in said memory of the list currently being processed, wherein said FIFO buffer is loaded from the address stored in said register.

7. The processing system of claim 6, further comprising:

means for maintaining currency between the contents of said FIFO buffer and contents of said memory during multiple contiguous list processing, including a control directive for forcing a reload of said FIFO buffer from the address stored in said register.

8. The processing system of claim 1, said display list processor further comprising:

a first register for specifying a hardware register in said graphics accelerator, said hardware register containing status information relating to a graphics operation;

a second register for defining a status condition to be tested for;

a third register for defining selected portions of said status information in said hardware register;

means for causing the status condition in said second register to be periodically compared with said selected portions in said hardware register; and means for causing the processing of said display list by said display list processor to be halted until said selected portions match the status condition in said second register.

9. The processing system of claim 8, said display list processor further including a fourth register for inserting a delay period between accesses to said peripheral bus for reading the contents of said hardware register, when comparing said selected portions to said status condition.

10. The processing system of claim 1, said display list processor further comprising:

a first register for specifying a hardware register in said graphics accelerator, said hardware register containing status information relating to a graphics operation;

a second register for defining a status condition to be tested for;

a third register for defining selected portions of said status information in said hardware register;

means for causing the status condition in said second register to be compared with said selected portions in said hardware register; and means for altering the sequence of processing depending upon the result of the comparison.

11. The processing system of claim 1, said display list processor further comprising:

a first register for specifying a status register in said display list processor, said status register containing status information relating to an external hardware event;

a second register for defining a status condition to be tested for;

a third register for defining selected portions of said status information in said status register;

means for causing the status condition in said second register to be periodically compared with said selected portions in said status register; and means for causing the processing of said display list by said display list processor to be halted until said selected portions match the status condition in said second register.

12. The processing system of claim 1, said display list processor further comprising:

a first register for specifying a status register in said display list processor, said status register containing status information relating to an external hardware event;

a second register for defining a status condition to be tested for;

a third register for defining selected portions of said status information in said status register;

means for causing the status condition in said second register to be compared with said selected portions in said hardware register; and means for altering the sequence of processing depending upon the result of the comparison.

13. The processing system of claim 1, said display list processor further comprising:

a first register for storing the address of the first directive of a sequence of directives in a display list to be repeated in a loop;

a second register for storing a count of loops to be executed;

a third register for indicating to said display list processor that looping is to be done;

means for decrementing said second register to record loop execution;

means for testing the value of said second register;

means for accessing said first register to return to said first directive to repeat said sequence if said value is greater than zero; and means for exiting the loop if said value is not greater than zero.

14. The processing system of claim 1, further comprising:

a display list including control directives and stream data words;

a first register in said display list processor for storing the address of a port in said graphics accelerator for receiving said stream data words;

a second register in said display list processor for holding a count of said stream data words;

means for initiating a stream data mode for said display list processor.

15. The processing system of claim 14, further comprising:

means for decrementing said second register; and means for exiting said stream data mode when said second register has been decremented to zero.

16. The processing system of claim 1, wherein said hardware function directives and control directives comprise address/data pairs.

17. A method of graphics processing comprising:

providing a host processor which generates and stores a display list in a memory, said display list comprising hardware function directives and control directives;

providing a graphics accelerator for receiving said hardware function directives and for performing graphics operations in response thereto; and providing a programmable display list processor for processing said display list in accordance with said control directives, said processing including issuing said hardware function directives to said graphics accelerator.

18. The method of claim 17, further comprising:

storing in a first register in said display list processor a count of display lists, generated and stored by the host processor in said memory, to be processed by the display list processor;

storing in a second register in said display list processor an increment of at least one to said count, indicating that at least one new display list has been stored in said memory by said host processor for processing by said display list processor; and adding said increment in said second register to said first register.

19. The method of claim 18, further comprising the steps of:

zeroing said second register after adding said increment; and decrementing said first register by one each time the processing of a display list is completed.

20. The method of claim 19 wherein said decrementing step includes providing, at the end of each display list, a control directive loading said second register with a value of negative one.

21. The method of claim 17, further comprising:

storing a portion of the display list currently being processed in a FIFO buffer in said display list processor.

22. The method of claim 21, further comprising:

storing the address in said memory of the list currently being processed in a register in said display list processor, wherein said FIFO buffer is loaded from the address stored in said register.

23. The method of claim 22, further comprising:

at the end of a display list, processing a control directive for forcing a reload of said FIFO buffer from the address stored in said register, to maintain currency between the contents of said FIFO buffer and contents of said memory during multiple contiguous list processing.

24. The method of claim 17, further comprising:

providing a first register in said display list processor for specifying a hardware register in said graphics accelerator, said hardware register containing status information relating to a graphics operation;

providing a second register in said display list processor for defining a status condition to be tested for;

providing a third register in said display list processor for defining selected portions of said status information in said hardware register;

processing control directives for loading said first, second and third registers, for causing the status condition in said second register to be periodically compared with said selected portions in said hardware register; and for causing the processing of said display list by said display list processor to be halted until said selected portions match the status condition in said second register.

25. The method of claim 24, further comprising:

providing a fourth register in said display list processor for inserting a delay period between accesses to a peripheral bus for reading the contents of said hardware register, when comparing said selected portions to said status condition.

26. The method of claim 17, further comprising:

providing a first register in said display list processor for specifying a hardware register in said graphics accelerator, said hardware register containing status information relating to a graphics operation;

providing a second register in said display list processor for defining a status condition to be tested for;

providing a third register in said display list processor for defining selected portions of said status information in said hardware register;

processing control directives for loading said first, second and third registers, for causing the status condition in said second register to be compared with said selected portions in said hardware register; and for altering the sequence of processing depending upon the result of the comparison.

27. The method of claim 17, further comprising:

providing a first register in said display list processor for specifying a status register in said display list processor, said status register containing status information relating to an external hardware event;

providing a second register in said display list processor for defining a status condition to be tested for;

providing a third register in said display list processor for defining selected portions of said status information in said status register;

processing control directives loading said first, second and third registers, for causing the status condition in said second register to be periodically compared with said selected portions in said status register; and for causing the processing of said display list by said display list processor to be halted until said selected portions match the status condition in said second register.

28. The method of claim 17, further comprising:

providing a first register in said display list processor for specifying a status register in said display list processor, said status register containing status information relating to an external hardware event;

providing a second register in said display list processor for defining a status condition to be tested for;

providing a third register in said display list processor for defining selected portions of said status information in said status register;

processing control directives for loading said first, second and third registers, for causing the status condition in said second register to be compared with said selected portions in said hardware register; and for altering the sequence of processing depending upon the result of the comparison.

29. The method of claim 17, further comprising:

providing a first register in said display list processor for storing the address of the first directive of a sequence of directives in a display list to be repeated in a loop;

providing a second register in said display list processor for storing a count of loops to be executed;

providing a third register in said display list processor for indicating to said display list processor that looping is to be done;

processing control directives for loading said first, second and third registers, for:

decrementing said second register to record loop execution;

testing the value of said second register;

accessing said first register to return said first directive to repeat said sequence if said value is greater than zero; and for exiting the loop if said value is not greater than zero.

30. The method of claim 17, further comprising:

including control directives and stream data words in said display list;

providing a first register in said display list processor for storing the address of a port in said graphics accelerator for receiving said stream data words;

providing a second register in said display list processor for holding a count of said stream data words;

processing a control directive to load said second register, for initiating a stream data mode for said display list processor.

31. The method of claim 30, further comprising:

decrementing said second register; and exiting said stream data mode when said second register has been decremented to zero.

32. The method of claim 17, wherein said hardware function directives and control directives comprise address/data pairs.

33. A processor subsystem, comprising;

a bus;

a primary bus controller coupled to said bus;

a primary processor coupled to said primary bus controller;

a memory coupled to said bus for storing a first set of commands for display list processing and a second set of commands for generation of pixel information;

a first processor coupled to said bus for receiving said first and second sets of commands and for processing said first set of commands, said first processor being coupled to said bus and acting as a secondary bus controller; and a second processor coupled to said bus for processing said second set of commands.

\* \* \* \* \*